Oct. 29, 1946.　　S. B. HASELTINE　　2,410,160

COMBINED SPRING AND FRICTION SHOCK ABSORBER

Filed Nov. 24, 1943

Inventor
Stacy B. Haseltine
By Henry Fuchs
Atty.

Patented Oct. 29, 1946

2,410,160

UNITED STATES PATENT OFFICE 2,410,160

COMBINED SPRING AND FRICTION SHOCK ABSORBER

Stacy B. Haseltine, La Grange, Ill., assignor to W. H. Miner, Inc., Chicago, Ill., a corporation of Delaware Application November 24, 1943, Serial No. 511,505

8 Claims. (Cl. 267—9)

This invention relates to improvements in combined spring and friction shock absorbers, especially adapted for use in connection with railway car trucks.

One object of the invention is to provide a combined spring and friction shock absorber, especially adapted for use in connection with truck springs of railway cars to snub or dampen the action of the springs.

Another object of the invention is to provide a friction shock absorber, adapted to be substituted for one or more of the spring units of a cluster of truck springs of a railway car, comprising a pair of relatively slidable friction elements, and spring means opposing relative sliding movement of said elements wherein the spring means also functions to press said elements in frictional contact with each other.

A more specific object of the invention is to provide a friction shock absorber of the character indicated in the preceding paragraph, wherein the friction elements are in the form of relatively movable friction posts adapted to be tilted toward each other to bring the same into close frictional contact, and the spring means, which opposes relative sliding movement of the posts and presses the same into contact with each other, is in the form of a coil spring element surrounding the posts and closely embracing the same, thereby yieldingly resisting lateral separation of said posts.

Other objects of the invention will more clearly appear from the description and claims hereinafter following.

Figure 1:
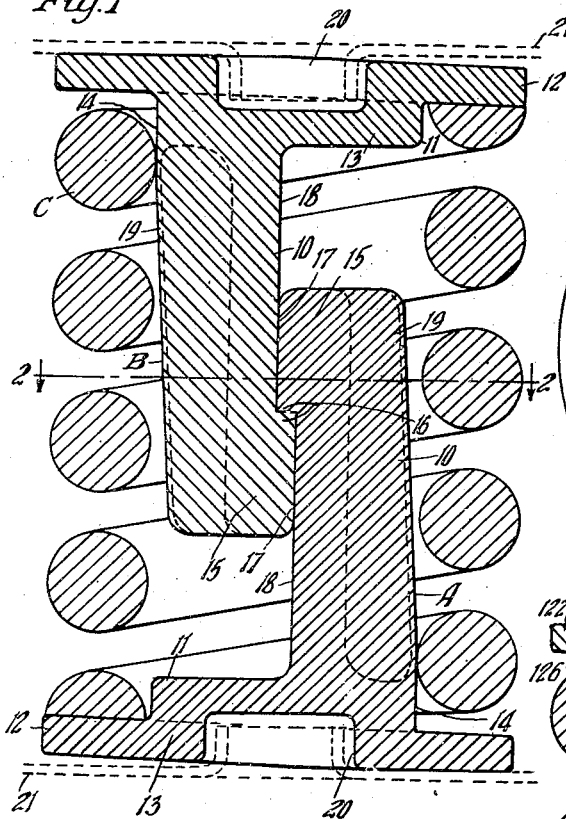
Figure 3:
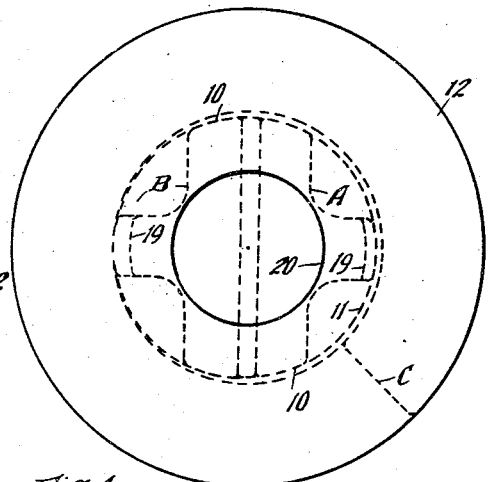
Figure 2:
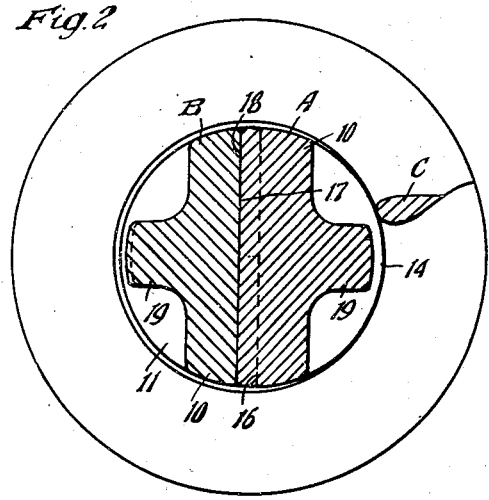
Figure 4:
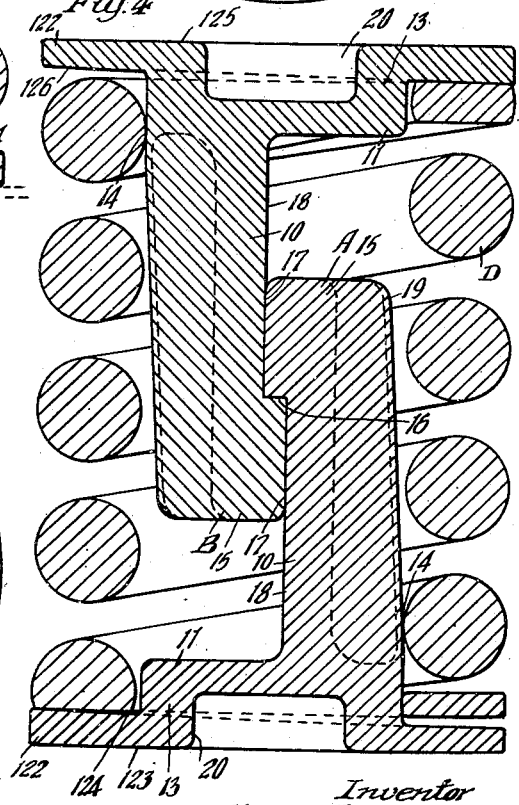

In the drawing forming a part of this specification, Figure 1 is a vertical sectional view of my improved friction shock absorber. Figure 2 is a horizontal sectional view, corresponding substantially to the line 2—2 of Figure 1. Figure 3 is a top plan view of Figure 1. Figure 4 is a view, similar to Figure 1, illustrating another embodiment of the invention.

In said drawing, referring first to the embodiment of the invention illustrated in Figures 1, 2, and 3, my improved friction shock absorber comprises broadly two similar friction posts A and B and a spring resistance C.

The friction posts A and B are identical, each post comprising a vertically disposed heavy plate 10 having a cylindrical base portion 11 eccentric thereto, and a laterally extending annular flange 12 projecting from said base portion, concentric with the vertical central axis of the mechanism. The base portion 11 is slightly eccentric with respect to the vertical central axis of the mechanism and said base portion 11 and flange 12 together form a follower plate or disc member 13 which cooperates with the spring resistance C. The peripheral cylindrical surface of the base portion 11 of the plate 10, which surface is indicated by 14, presents a substantially vertically extending abutment wall for a purpose hereinafter described. The two posts A and B are reversely arranged, that is, the post B is inverted with respect to the position of the post A. As shown most clearly in Figure 1, the follower plate member 13 of the post A is located at the bottom end of the mechanism and has the friction plate 10 upstanding therefrom, while the follower plate portion 13 of the post B is located at the upper end of the mechanism and has the friction plate 10 depending therefrom.

The free end portion of the friction plate section of each post is laterally inwardly enlarged, as indicated at 15, thereby providing a horizontal shoulder 16. As clearly shown in Figure 1, the enlarged portion 15 of the post A is at the upper end thereof while the enlarged portion of the post B is at the lower end of the latter and the shoulders of the two posts overhang each other to engage and limit separation of the posts in lengthwise direction and hold the mechanism assembled.

On the inner side, the friction plate member 10 of each post has flat friction surfaces 17 and 18 offset with respect to each other, said friction surfaces being formed respectively on the inward enlargement 15 and the main body portion of said plate member, the friction surface 17 of the post A having sliding contact with the friction surface 18 of the post B, and the friction surface 18 of the post A having sliding contact with the friction surface 17 of the post B. The friction plate portion 10 of each post is reinforced on its outer side by a longitudinal central rib 19 extending from the base portion 11 to the outer end of the friction plate. As shown most clearly in Figure 2, the outer edge of the rib is rounded off transversely to correspond with the curvature of the cylindrical outer surface 14 of said base portion 11 and merges with the surface 14, as shown in Figure 1. The rib 19 is preferably slightly inclined inwardly toward the vertical axis of the mechanism, the rib of the post A being inclined inwardly in upward direction and that of the post B being inclined inwardly in downward direction. Each post is thus, in effect, tapered toward its outer end.

As shown most clearly in Figure 1, the flange 12 of the follower plate 13 of the post A is of reduced thickness at the right hand side, and the flange 12 of the post B is of reduced thickness at the left hand side of the mechanism, thereby providing clearance between the spring C and said reduced portions of the flanges 12—12. As further shown in Figure 1, the underneath surface of the follower plate member 13 of each post is at slightly less than a right angle to the planes of the friction surfaces 17 and 18 of the plate 10 of the post. As will be evident, the follower plate member 13 of each post is thus tilted slightly with respect to a horizontal plane. As shown in Figure 2, the follower plate member of the post A is tilted upwardly at the left hand end and the follower plate member of the post B is tilted downwardly at the right hand end. Each follower plate member 13 is provided with a central pocket or seat 20 adapted to receive the usual spring centering projection of the corresponding spring follower plate 21 of the truck spring cluster, said follower plate being shown in dotted lines in Figure 1.

The parts of the friction posts are so proportioned that movement of the posts in lengthwise direction toward each other is positively limited by engagement of the outer end of the post B with the upper side of the base portion 11 of the post A and by engagement of the outer end of the post A with the underneath side of the base portion 11 of the post B.

The spring resistance C, which is in the form of a heavy coil, surrounds the posts A and B and bears at its top and bottom ends on the top and bottom follower plate members 13—13. The spring C is under initial compression and the inner sides of the top and bottom coils bear on the vertical walls 14 of the base portions 11 of the posts at the outer sides of said posts, that is, the inner side of the coil at the upper end of the spring bears on the wall 14 of the base member 11 of the post B at the left hand side of the mechanism, and the coil at the lower end of the spring bears on the wall 14 of the base member 11 of the post A at the right hand side of the mechanism, as seen in Figure 1. Inasmuch as the cylindrical base portions 11 of the posts are eccentric to the vertical central axis of the spring C and the mechanism as a whole, there is a substantial clearance between the wall 14 of the base member 11 of the post A and the inner side of the lower coil of the spring at the left hand side of the mechanism and between the wall 14 of the base member 11 of the post B and the inner side of the upper coil of the spring at the right hand side, as seen in Figure 1.

In assembling the mechanism shown in Figures 1, 2, and 3, the spring C is first placed over the friction plate 10 of the post A. The post B is then assembled with the other parts by inserting the friction plate 10 of the same downwardly within the coils of the spring, the posts A and B being held in tilted position away from each other so that the enlargements 15—15 thereof will pass each other. This tilting movement of the posts within the spring is permitted by the clearance provided due to the taper of the ribbed portions of the posts. The parts are forced together until the shoulders 16—16 pass each other, whereupon the shoulder of the post B will snap under the shoulder of the post A, thereby locking the posts together against lengthwise separation.

My improved shock absorber preferably replaces one or more of the spring units of a truck spring cluster, being interposed between the usual top and bottom spring plates which cooperate with said cluster; however, several of such shock absorbing units may be employed in a single spring cluster replacing two or more units of the latter.

The operation of the improved shock absorber illustrated in Figures 1, 2, and 3 is as follows: Upon the spring cluster of the truck of a railway car being compressed between the spring follower plates of the cluster, the shock absorbing unit, which is disposed between said follower plates, is compressed therewith, thereby forcing the post B downwardly toward the post A, against the resistance of the spring C. Due to the tilted condition of the follower plate members 13—13, with respect to the spring follower plates of the truck spring cluster, the pressure exerted by the spring C in being compressed will act to rock the posts toward each other, thereby placing the friction surfaces thereof in tight frictional contact. At the same time, due to the tendency of the follower plate members 13—13 to seat flatly on the spring follower plates of the spring cluster, a canting action of the spring is produced which causes the coil at the lower end of the spring to be forced laterally against the cylindrical base portion of the post A at the right hand side of the mechanism and the coil at the upper end of the spring to be forced laterally against the cylindrical base portion of the post B, at the left hand side of the mechanism, thereby tightly pressing together the friction surface portions of said posts. During relative lengthwise movement of the posts on their friction surfaces during compression of the mechanism, the required frictional resistance is developed to effectively snub the action of the truck springs. Upon release of the mechanism, the posts A and B are restored to the normal position shown in Figure 1 by the expansive action of the spring C, longitudinal separation of the posts being limited by engagement of the shoulders 16—16 of the posts with each other.

Referring next to the embodiment of the invention illustrated in Figure 4, the design is identical with that shown in Figures 1, 2, and 3, with the exception that the flanges of the top and bottom follower plates of the posts are of slightly different design, the top surface of the upper follower plate, and the underneath surface of the bottom follower plate being at right angles to the vertical central axis of the mechanism, and the flanges of said follower plates being transversely tapered from end to end.

The mechanism illustrated in Figure 4 comprises interengaging friction posts which are identical with the posts hereinbefore described in connection with Figures 1, 2, and 3, except as hereinafter pointed out. The posts and parts thereof, which are identical with those shown in Figures 1, 2, and 3, are indicated by the same reference characters.

The base portion 11 of each post A and B has a peripheral flange 122 which tapers from one side to the other, the flange 122 of the post A being of reduced thickness at the right hand side of the mechanism and the flange 122 of the post B being of reduced thickness at the left hand side of the mechanism, as viewed in Figure 4. The bottom surface 123 of the flange 122 of the post A lies in a plane at right angles to the planes of the friction surfaces of said post and the top surface 124 of said flange is inclined upwardly toward the left hand side, as seen in Figure 4. The top surface 125 of the flange 122 of the post B lies in a plane at right angles to the planes of the friction surfaces of said post and the bottom surface 126 is inclined upwardly toward the left, as seen in Figure 4. The opposed surfaces 124 and 126 of the flanges are substantially parallel and the surfaces 123 and 125 of said flanges have substantially flat bearing on the bottom and top spring followers of the truck spring cluster. The spring shown in Figure 4, which is indicated by D, is substantially identical with the spring C, hereinbefore described.

The spring D surrounds the friction plate members 10—10 of the posts A and B and bears at its top and bottom ends on the flanges 122—122 of the friction posts B and A, respectively. The spring D is placed and arranged similarly to the spring C, hereinbefore described, the tapered flanges 122—122 of the posts providing clearance at the left hand side of the mechanism between the flange 122 of the post B and the coil at the top end of the spring D, and at the right hand side of the mechanism between the flange 122 of the post A and the coil at the bottom end of the spring, as seen in Figure 4.

The procedure of assembling the mechanism is the same as that hereinbefore described in connection with Figures 1, 2, and 3.

The operation is also the same as hereinbefore described, with the exception that the pressure of the spring D on the follower plate members of the posts does not tend to produce rocking action, the posts being forced together into tight frictional engagement by lateral pressure exerted by the spring D, the spring D, while being compressed between the followers, having a canting action due to the tendency of the top and bottom coils to seat flatly on the tapered flanges 122—122 of the spring follower members 13—13 of the posts A and B.

I have herein shown and described what I now consider the preferred manner of carrying out my invention, but the same is merely illustrative and I contemplate all changes and modifications that come within the scope of the claims appended hereto.

I claim:

1. In a friction shock absorber mechanism, the combination with an upper friction post having a base portion at the upper end thereof, said base portion having a vertical abutment surface on the outer side thereof at one side of the mechanism; of a lower friction post having a base portion at the lower end thereof, said base portion having a vertical abutment surface at the outer side thereof at the opposite side of the mechanism, said posts having lengthwise sliding engagement with each other; and a coil spring surrounding said posts and opposing relative longitudinal movement thereof, said coil spring having the inner sides of the coils at the top and bottom ends in bearing engagement respectively with the abutment surfaces of said base portions.

2. In a friction shock absorber, the combination with a top spring follower plate; of a bottom spring follower plate; a top friction post depending from said top plate; a bottom friction post upstanding from said bottom spring follower plate, said posts having lengthwise sliding engagement with each other, said top post having a lateral abutment face at its base end at the outer side of said post, said bottom post having a lateral abutment face at its base end at the outer side of the post; and a coil spring enclosing said posts and bearing at its top and bottom ends on said top and bottom spring follower plates, said spring having the inner sides of the top and bottom coils thereof bearing on said lateral abutment faces of said posts.

3. In a friction shock absorber, the combination with a top spring follower plate; of a bottom spring follower plate; a top friction post depending from said top plate; a bottom friction post upstanding from said bottom spring follower plate, said posts having cooperating friction surfaces on the inner sides thereof; and a coil spring surrounding said posts, bearing at its top and bottom ends on said top and bottom spring follower plates, said spring having the inner side of the coil at the upper end seated against the outer side of the top post at the base portion of the latter below said top spring follower plate, and the inner side of the bottom coil thereof seated against the outer side of the bottom post at the base portion of the latter above said bottom spring follower plate.

4. In a friction shock absorber, the combination with a top friction post having a follower plate at its upper end laterally projecting therefrom, said follower plate having top and bottom surfaces laterally inclined with respect to each other, said top surface lying in a horizontal plane; of a bottom friction post having a follower plate at its bottom end laterally extending therefrom, said follower plate having top and bottom surfaces laterally inclined with respect to each other, said last named bottom surface lying in a horizontal plane, said posts being in longitudinal sliding engagement with each other; and a coil spring surrounding said posts and having the top and bottom ends thereof bearing on said follower plates respectively.

5. In a friction shock absorber, the combination with a top friction post having a laterally extending follower plate section at its upper end; of a bottom friction post having a laterally extending follower plate section at its bottom end, said posts having sliding engagement with each other along their inner sides; interengaging shoulders on said posts for limiting lengthwise separation thereof; and a coil spring surrounding said posts and having its top and bottom ends bearing on said follower plate sections of said top and bottom posts respectively.

6. In a friction shock absorber, the combination with a top friction post having a follower plate portion at its upper end; of a bottom friction post having a follower plate at its lower end, said posts being tiltable toward each other by rocking movement of said follower plates; and a coil spring surrounding said posts and bearing at its top and bottom ends on said follower plates to rock the same and tilt the posts toward each other, said spring having the inner side of the coil at the upper end seated against the outer side of the top post at the base portion of the latter, and the inner side of the coil at the bottom end thereof seated against the outer side of the bottom post at the base portion of the latter.

7. In a friction shock absorber, the combination with a top friction post having a follower plate at its upper end inclined laterally; of a bottom friction post having a follower plate at its bottom end inclined laterally, said posts being tiltable toward each other by rocking movement of said follower plates; and a coil spring surrounding said posts and bearing at its top and bottom ends on said follower plates to rock the same and tilt the posts toward each other, said spring having the inner side of the coil at the upper end seated against the outer side of the top post at the base portion of the latter, and the inner side of the coil at the bottom end thereof seated against the outer side of the bottom post at the base portion of the latter.

8. In a friction shock absorber, the combination with a top friction post having a follower plate at its upper end laterally projecting therefrom, said follower plate having its bottom surface laterally inclined; of a bottom friction post having a follower plate at its bottom end laterally extending therefrom, said follower plate having its top surface laterally inclined, said posts being in longitudinal sliding engagement with each other; and a coil spring surrounding said posts and having the top and bottom ends thereof engaging said follower plates, said spring having the inner side of the coil at the upper end seated against the outer side of the top post at the base portion of the latter, and the inner side of the coil at the bottom end thereof seated against the outer side of the bottom post at the base portion of the latter.

STACY B. HASELTINE.